(12) United States Patent
Dickey

(10) Patent No.: US 9,139,126 B2
(45) Date of Patent: Sep. 22, 2015

(54) SHIPPING STRAP ASSEMBLY

(71) Applicant: Robert S. Dickey, Tucson, AZ (US)

(72) Inventor: Robert S. Dickey, Tucson, AZ (US)

(73) Assignee: Robert S. Dickey, Tucson, AZ (US)

( * ) Notice: Subject to any disclaimer, the term of this patent is extended or adjusted under 35 U.S.C. 154(b) by 104 days.

(21) Appl. No.: 13/935,278

(22) Filed: Jul. 3, 2013

(65) Prior Publication Data

US 2015/0016916 A1    Jan. 15, 2015

(51) Int. Cl.
*B60P 7/08* (2006.01)

(52) U.S. Cl.
CPC ............... *B60P 7/0823* (2013.01); *B60P 7/08* (2013.01); *Y10T 24/2117* (2015.01); *Y10T 24/2121* (2015.01)

(58) Field of Classification Search
CPC ............ B65D 2590/0016; B65D 90/0006; B65D 2563/108; B65D 2571/00098; B65D 2571/00111; B65D 63/10; B65D 63/16; B65D 67/02; B65D 71/0096; B63B 25/004; B63B 25/28; B64D 11/0007; B64D 9/003; B25B 25/00; B60N 2/02; B62J 11/00; B65B 17/02; B65H 75/185; B66F 15/00
USPC ........... 410/100, 103, 97, 98, 23, 101, 118, 7, 410/116, 12, 155, 106; 254/218, 214, 223, 254/24, 106, 108, 109, 213
See application file for complete search history.

(56) References Cited

U.S. PATENT DOCUMENTS

| 3,352,539 | A | * | 11/1967 | Witt | 410/23 |
| 4,451,956 | A | * | 6/1984 | Kawahara | 24/68 CD |
| 4,464,811 | A | * | 8/1984 | Holmes | 24/68 CD |
| 4,987,653 | A | * | 1/1991 | Lin | 24/68 CD |
| 5,108,237 | A | * | 4/1992 | Zankich | 410/21 |
| 5,549,429 | A | * | 8/1996 | Sergent | 410/96 |
| 8,037,580 | B2 | * | 10/2011 | Huang | 24/68 CD |
| 8,079,116 | B2 | * | 12/2011 | Ayers et al. | 24/68 CD |

* cited by examiner

*Primary Examiner* — Glenn Dayoan
*Assistant Examiner* — Sunsurraye Westbrook
(74) *Attorney, Agent, or Firm* — Nikia L. Gray; Quarles & Brady LLP

(57) ABSTRACT

A shipping strap assembly for use in securing items during transport. The shipping strap assembly includes a first locking element and a second locking element disposed within a frame. The locking elements may be cam buckles oriented in the same direction. In certain embodiments, the shipping strap assembly further includes a strap extending from one side of the frame to the other and engaging both the first and second locking elements, the strap being adjustable to form a nose between the first and second locking elements. In certain embodiments, the strap further terminates at one or both ends in an attachment element, which may include an E, L, or A-track fitting or a hook, ring, clip, clamp, coupler, shackle, or loop.

9 Claims, 10 Drawing Sheets

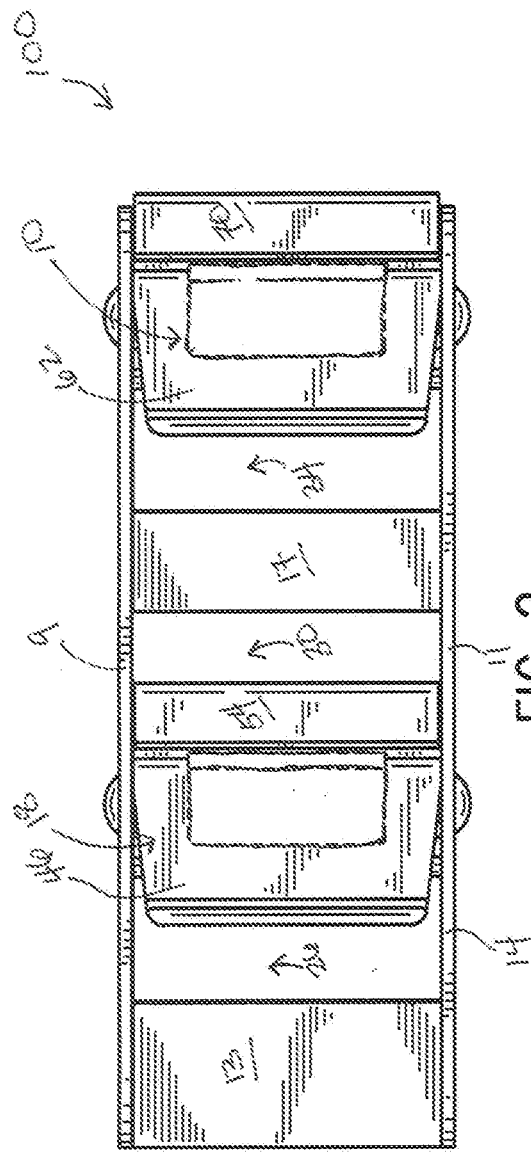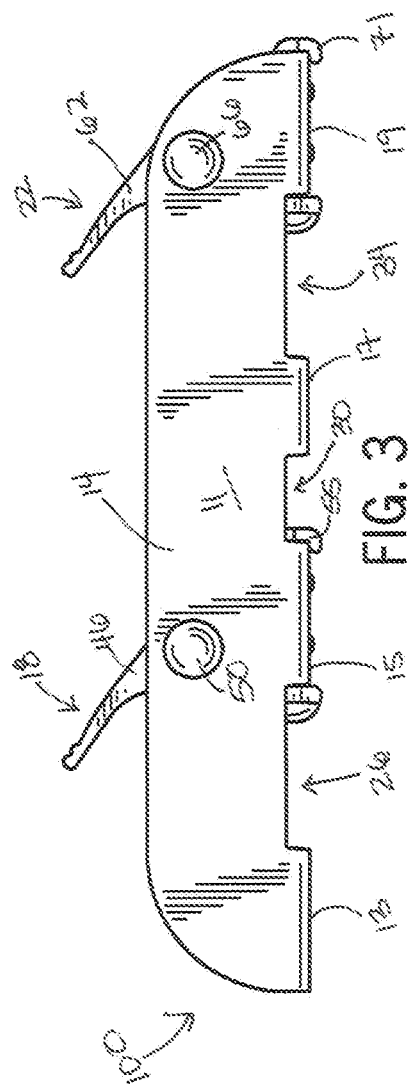

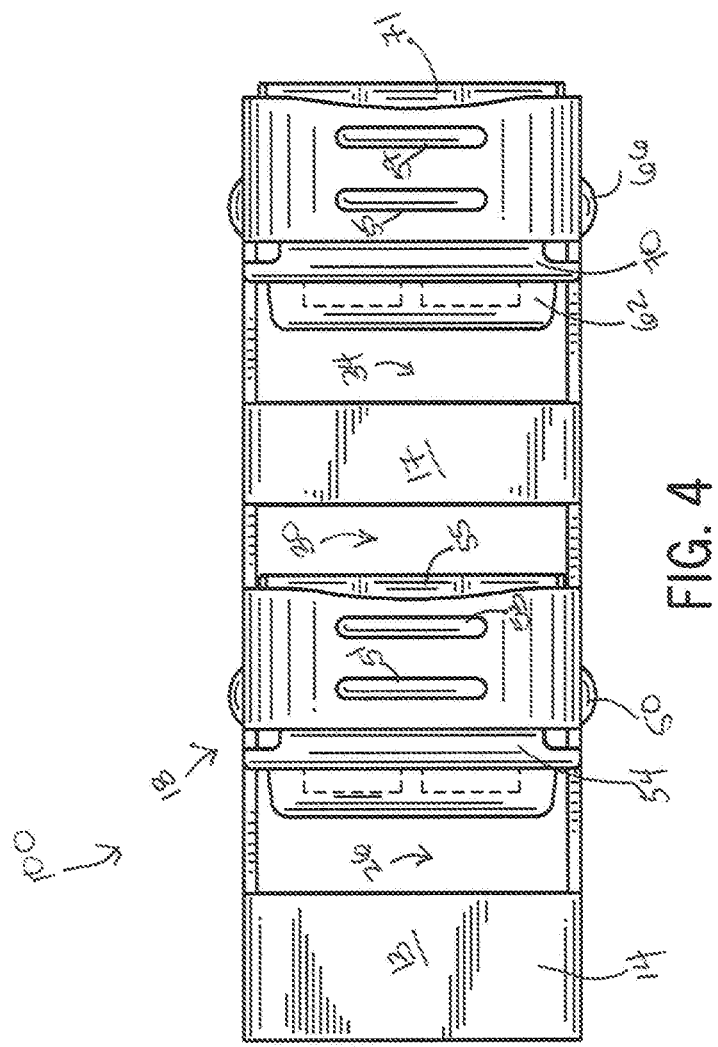

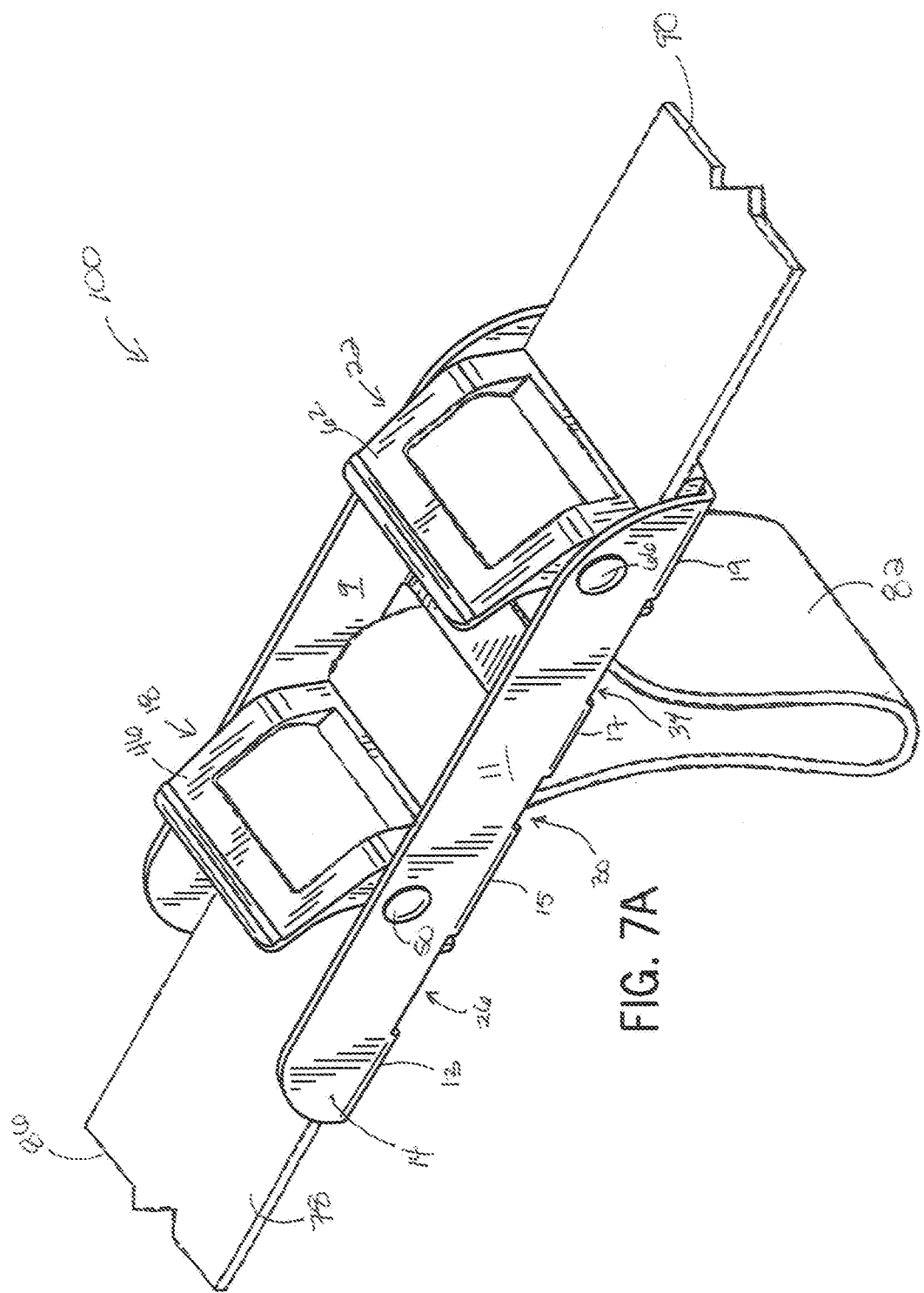

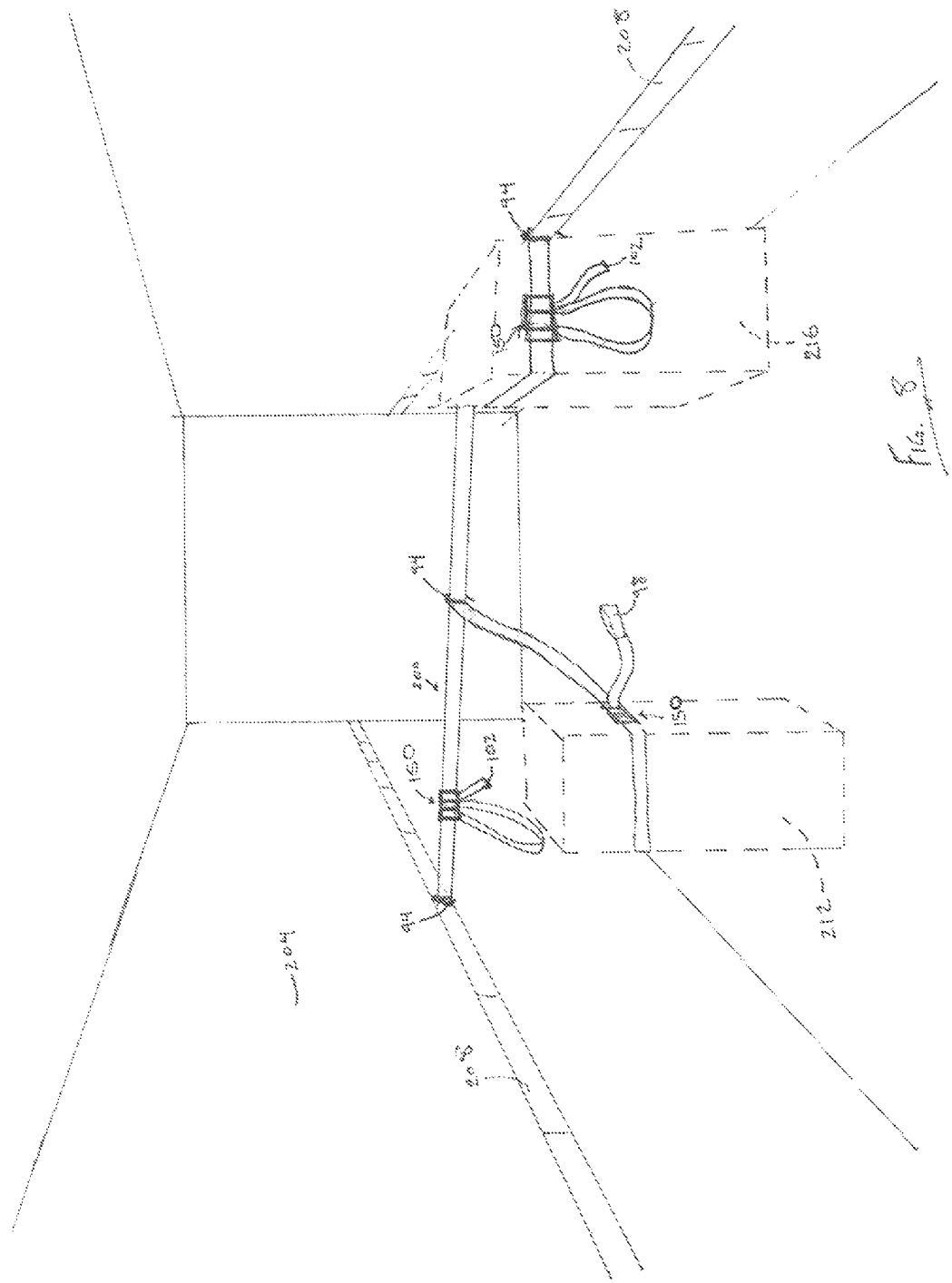

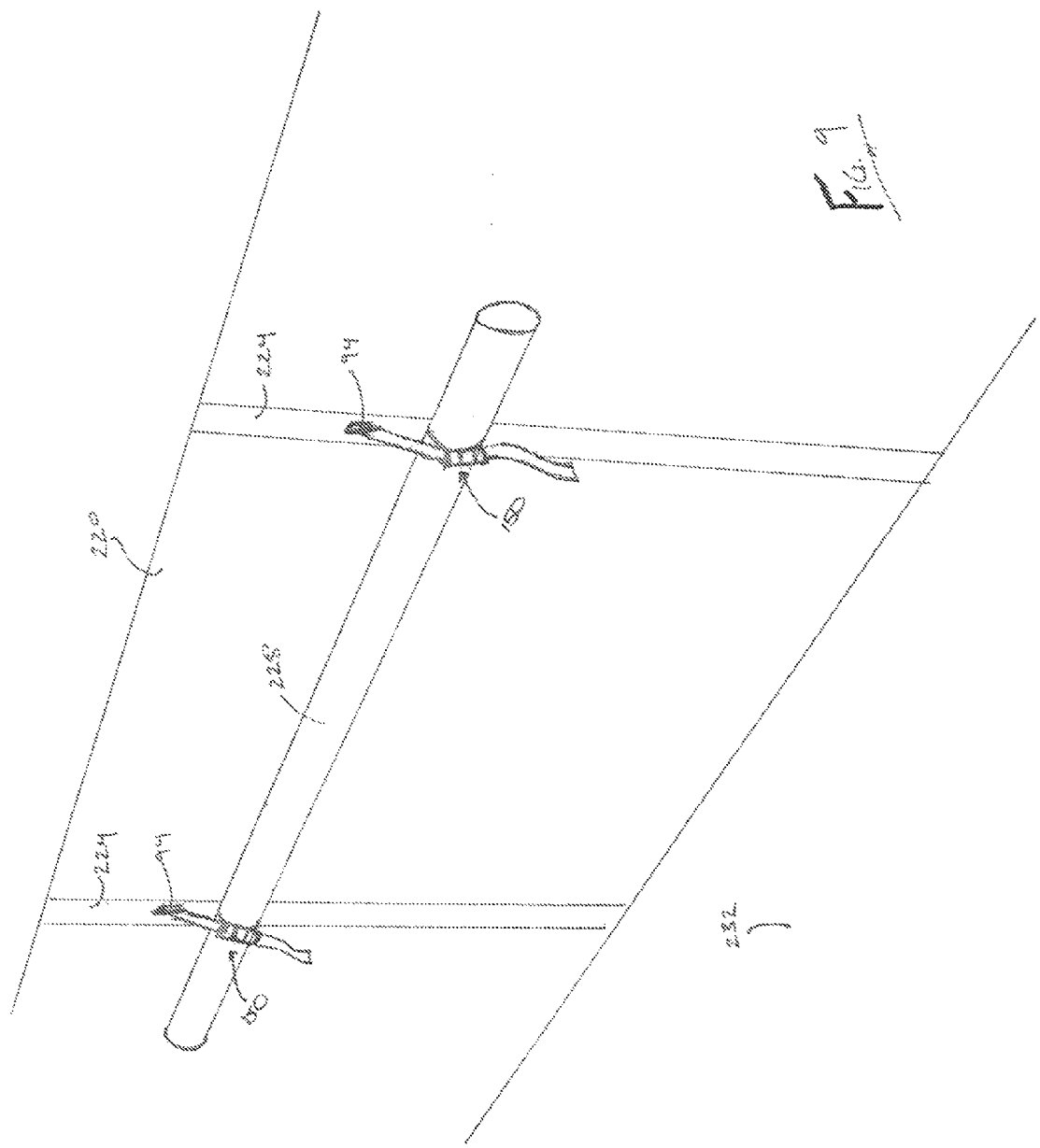

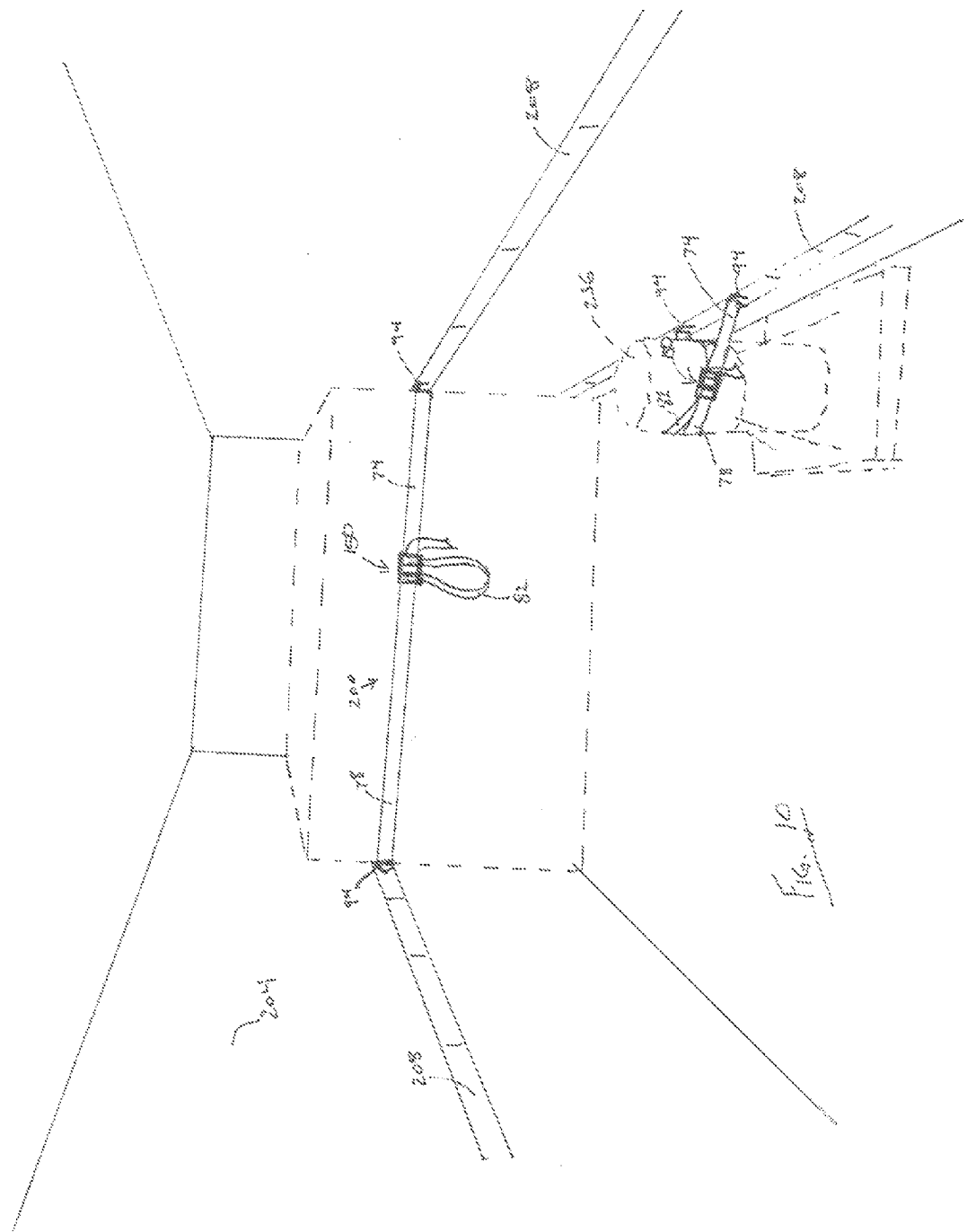

SHIPPING STRAP ASSEMBLY

FIELD OF THE INVENTION

The invention relates generally to tie-downs for use in shipping. More particularly, the invention relates to a strap system for securing items during shipment, storage, and loading/unloading.

BACKGROUND

Currently, the transport of cargo via trucks or freight containers is fraught with safety risks for the operator and results in a high volume of damaged articles being delivered to the consignee. For example, carriers often use liftgate trucks to transport product overland. As will be appreciated, liftgate trucks are transport vehicles that have been fitted with hydraulic liftgates which can be used to raise cargo from the ground to the height of the carrying floor (or vice versa). Liftgate trucks are particularly useful where either the sending or receiving location does not have a loading dock or other means to allow the cargo to be easily lifted onto or off of the truck. However, the use of liftgates poses significant safety risks for workers, particularly where the cargo is large or top heavy, as the worker has little to no control over the cargo while operating the liftgate. More specifically, most switches to operate liftgates are placed near the base of the carrying floor and require the operator to maintain contact with the switch while it is in operation. Thus, when operating the liftgate, the worker may be reaching above their head (when raising the liftgate) or below knee level (when lowering the liftgate) making it difficult, if not impossible, for the worker to maintain a secure hold on the cargo and to ensure that the same does not fall over while the liftgate is moving. For very tall or top heavy objects in particular, the worker may have little to no control over them while operating the liftgate. Additionally, many liftgates do not operate smoothly and may rock or even tilt. This is particularly dangerous where the cargo is heavy but has a high center of gravity. As can be appreciated, when such cargo becomes off-centered, it topples easily. Without the means to secure such cargo, there is a substantial risk that the same will fall over while on a moving liftgate, resulting in serious injury to the worker and/or damage to the cargo.

The loading and unloading of freight from shipping containers is likewise perilous. Often, deck tables and deck bars are used inside shipping containers to allow for different sized cargo to be loaded at different levels within the container, increasing the amount of cargo which can be moved via a single container. For example, long, thin packing tubes are often used to ship longer, more delicate items such as screens, awnings, wood moulding and the like. Ideally such items are placed on top of two or more deck bars that have been secured perpendicularly to the container's walls towards the top of the container, leaving space below for transport of bulkier items. However, loading and unloading such tubes from deck bars is problematic and the deck bars effectively limit the height of cargo that can be loaded thereunder. More specifically, because such tubes are often longer then the width of the container, to transport them in the way described, the tubes must generally be raised towards the ceiling first, the deck bars installed, and then the tubes lowered to sit on the deck bars. To unload the tubes, the same must occur in reverse. Typically the lifting of the tubes is done using a forklift with a skid of multiple wood pallets or a pallet with other cargo thereon. If the worker is not careful, he or she may end up smashing the tube into the ceiling of the container. Moreover, while being lifted or lowered, the tube is not secured to the skid in any manner and may roll or fall, increasing the risk of injury to the worker and of damage to the product. Further, many workers stand on the forklift or another raised platform to gain enough height to even install or remove the deck bars, thus creating a further safety hazard.

Clearly, given the foregoing, there is a need for a means for securing cargo during transport which decreases the risk of injury to the worker and of damage to the cargo.

BRIEF SUMMARY OF THE INVENTION

In one implementation a shipping strap assembly for use in securing items during transport is presented. The shipping strap assembly includes a first locking element and a second locking element disposed within a frame. The locking elements may be cam buckles oriented in the same direction. In certain embodiments, the shipping strap assembly further includes a strap extending from one side of the frame to the other and engaging both the first and second locking elements, the strap being adjustable to form a nose between the first and second locking elements. In certain embodiments, the strap further terminates at one or both ends in an attachment element, which may include an E, L, or A-track fitting or a hook, ring, clip, clamp, coupler, shackle, or loop.

In another implementation a shipping strap assembly is presented that includes a cam block and a first strap coupled to the cam block such that the first strap has a first portion extending from a first end of the cam block and a second portion extending from a second end of the cam block, where the strap is adjustable to form a noose between the first portion and the second portion. In such embodiments, a first attachment element may be disposed on the terminus of the first portion while a second attachment element is disposed on the terminus of the second portion.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 2 is a top view of the cam block of FIG. 1A.

FIG. 3 is a right side view of the cam block of FIG. 1A.

FIG. 4 is a bottom view of the cam block of FIG. 1A.

FIG. 7A is a perspective view of a shipping strap assembly including the cam block of FIG. 1A.

FIG. 8 is a perspective view of a first use of a shipping strap according to the present invention.

FIG. 9 is a perspective view of a second use of the shipping strap assembly according to the present invention.

FIG. 10 is a perspective view of a third use of the shipping strap assembly according to the present invention.

Figure 1A:
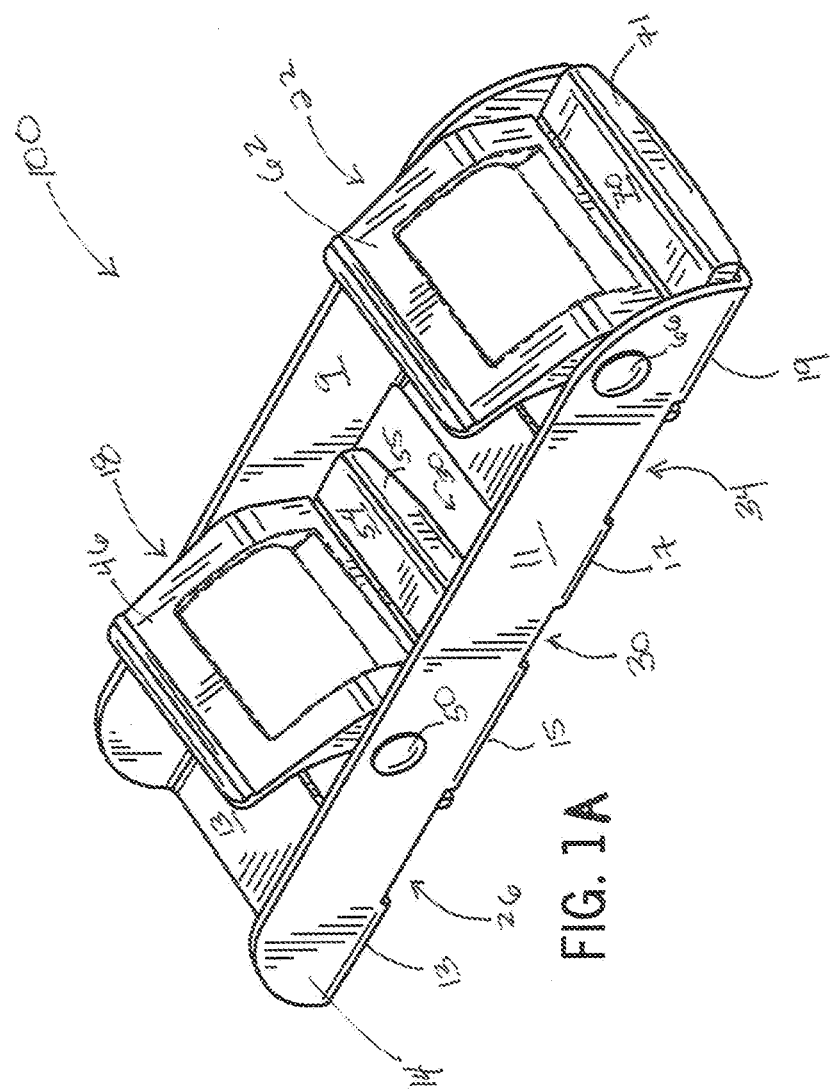
FIG. 1A is a perspective view of a cam block according to one embodiment of the invention.
Figure 1B:
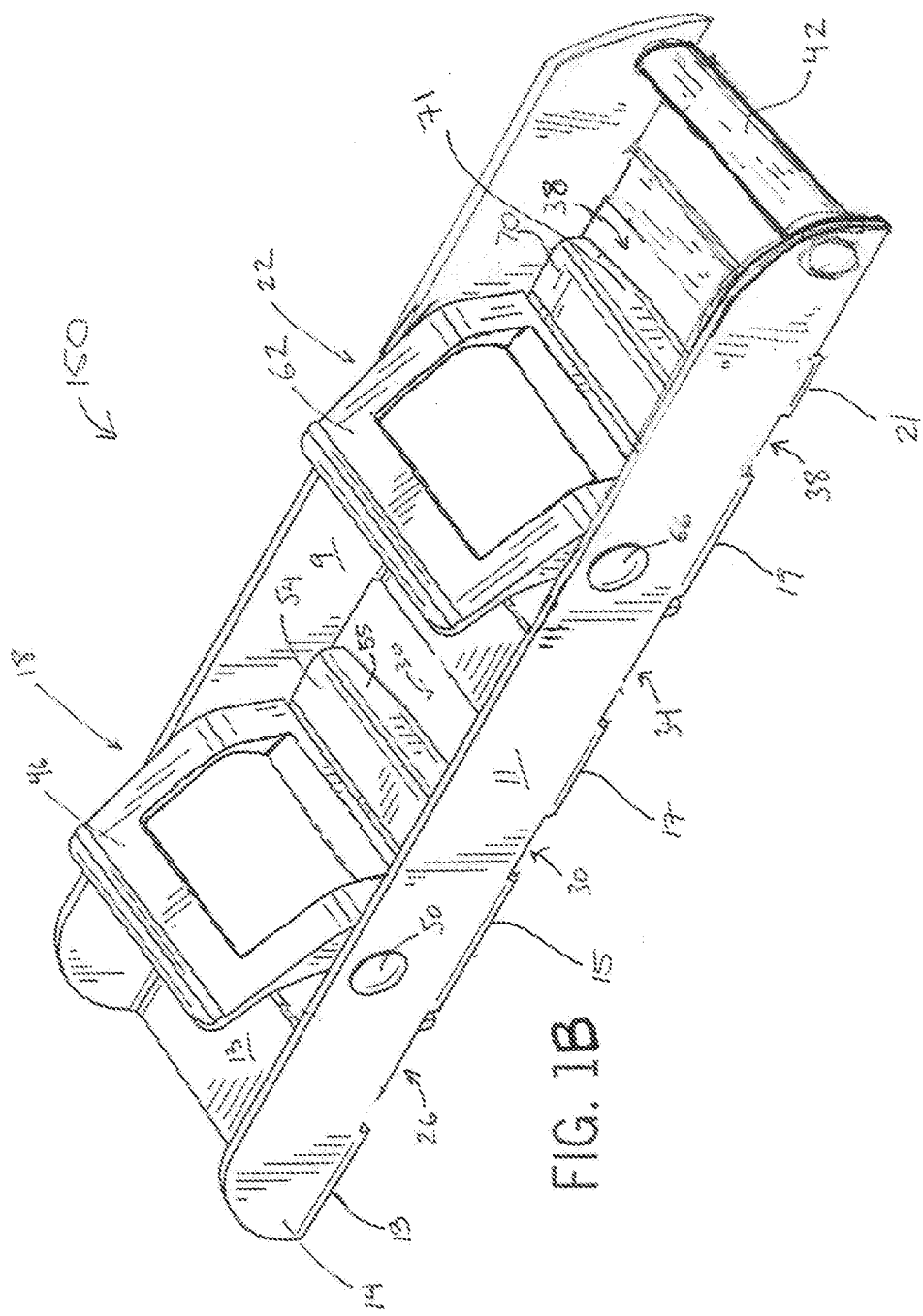
FIG. 1B is a perspective view of a cam block according to another embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention includes a shipping strap assembly that can be used by a single person to safely secure and move large, unwieldy, and even irregularly shaped objects by themselves, with or without the aide of a fork lift, dolly, or other device as the situation calls for. Furthermore, the present invention allows cargo to be loaded, secured, and unloaded without damage.

Turning now to FIGS. 1A-6, cam block 100, 150 is illustrated and shown as including a frame 14, a first cam buckle 18, and a second cam buckle 22. The frame 14 comprises sides 11 and 9 connected by cross bars 13, 15, 17, and 19. In certain embodiments sides 11 and 9 are further connected by cross bar 21 and pin 42 disposed at one end of frame 14. Cross bars 13, 15, 17, and 19 define apertures 26, 30, and 34 there between. In embodiments, such as is illustrated in FIG. 1B specifically, cam block 150 further comprises cross bar 21 and pin 42, wherein the same define apertures 38 and 41.

In certain embodiments sides 1 and 9 and cross bars 13, 15, 17, and 19 are formed from a continuous piece of metal. In certain such embodiments frame 14 formed via stamping of sheet metal. In other such embodiments frame 14 is cast. In other embodiments sides 1 and 9 and cross bars 13, 15, 17, and 19 are formed from multiple pieces of metal that have been welded or otherwise affixed together. In certain embodiments frame 14 may comprise a first half having cam buckle 18 and a second half having cam buckle 22, where the first half and the second half are releasable attached to one another. In such embodiments, a user may separate or reconnect the halves of frame 14 as needed.

In certain embodiments frame 14 comprises an alloy. In certain embodiments frame 14 is steel. In certain such embodiments frame 14 is a high strength steel. In certain such embodiments the high strength steel has a yield strength range of 205 to 420 MPa (30-60 KSI). In certain other embodiments frame 14 is an ultra high strength steel having a yield strength greater than 420 MPa. In other embodiments frame 14 has a yield strength greater than 600 MPa. In other embodiments frame 14 has a yield strength greater than 800 MPa. In yet other embodiments frame 14 has a yield strength greater than 1000 MPa. In certain embodiments frame 14 is a non-bake hardenable steel, baked hardenable steel, high strength solution strengthened steel, high strength low alloy steel, high strength recovery annealed steel, ultra high strength dual phase steel, transformation-induced plasticity steel, or ultra high strength low carbon martensite steel. In other embodiments, frame 14 is a metal other than steel. In certain embodiments frame 14 is heat treated to further increase its material strength.

In yet further embodiments frame 14 is zinc plated for corrosion protection. In yet other embodiments frame 14 is otherwise treated for corrosion resistance. In yet other embodiments frame 14 is coated.

In certain embodiments cross bars 13, 15, 17, and 19 are spaced along frame 14 such that apertures 26, 30, and 34 are the same width. In other embodiments cross bars 13, 15, 17, and 19 are spaced along frame 14 such that apertures 26, 30, and 34 are not the same width.

Figure 6:
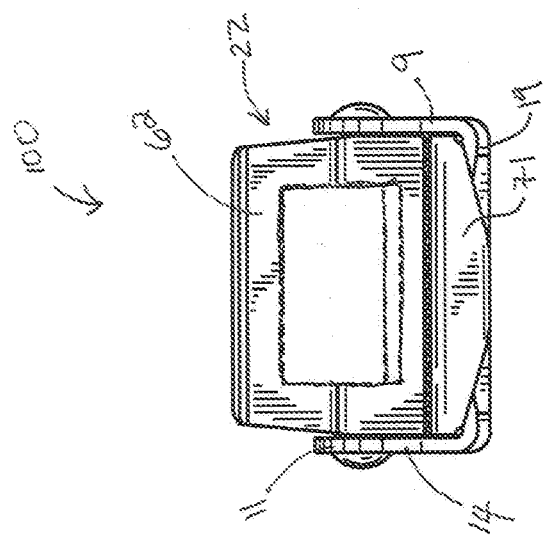
FIG. 6 is a rear view of the cam block of FIG. 1A.

The first cam buckle 18 includes a first cam lever 46 rotatably mounted to the frame 14 by a first cam pin 50 and a first cam base 54 mounted to the frame 14 between the first aperture 26 and the second aperture 30. The first cam lever 46 is moveable between an engaged position and a disengaged position and is biased toward the engaged position by a spring or other biasing element (not shown). As shown in FIG. 6, the first cam lever 46 includes a friction increasing feature in the form of a knurled portion 58. The first cam lever 46 is arranged such that when the first cam lever 46 is in the engaged position, the knurled portion 58 is closer to the first cam base 54 than when the first cam lever 46 is in the disengaged position.

The second cam buckle 22 is similar configured to the first cam buckle 18 and includes a second cam lever 62 rotatably mounted to the frame 14 by a second cam pin 66 and a second cam base 70 mounted to the frame 14 between the third aperture 34 and the fourth aperture 38. The second cam lever 62 is moveable between an engaged position and a disengaged position and is biased toward the engaged position by a spring or other biasing element (not shown). The second cam lever 62 includes a friction increasing feature in the form of a knurled portion that is the same as the knurled portion 58. The second cam lever 62 is arranged such that when the second cam lever 62 is in the engaged position, the knurled portion is closer to the second cam base 70 than when the second cam lever 62 is in the disengaged position.

In other embodiments, the cam buckles 18, 22 are not biased toward the engaged position. For example, the cam buckles 18, 22 may lock in an over center arrangement. The apertures 26, 30, 34, 38 may be arranged differently or the apertures 26, 30, 34, 38 may be eliminated. The cam buckles 18, 22 may include ratchets or another device to aid in a tightening and loosening action.

In certain embodiments cam buckles 18, 22 are formed from the same material as frame 14. As such, cam buckles 18, 22 may be formed from one of the materials previously disclosed herein in relation to frame 14. In other embodiments cam buckles are formed from a different material than frame 14.

As shown in FIGS. 1-6, cam buckles 18, 22 are oriented within frame 14 such that each faces the same direction (i.e., such that knurled portion 58 of each cam buckle faces the same direction when the cam buckles are in the engaged position). In other embodiments, cam buckles 18, 22 are oriented within frame 14 such that they face the opposite directions.

Figure 5:
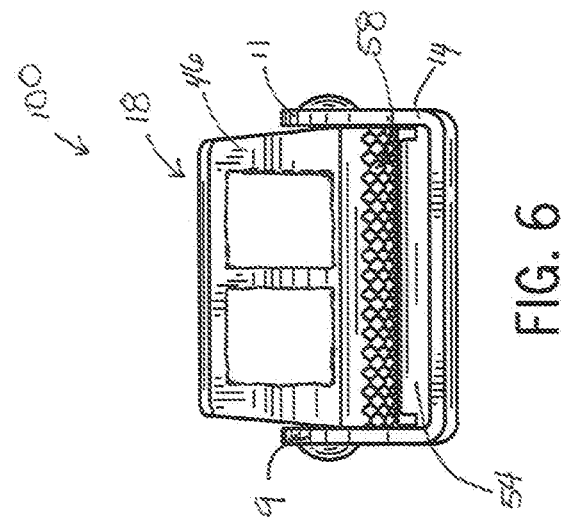
FIG. 5 is a front view of the cam block of FIG. 1A.

As can be seen in at least FIGS. 1A and 4, cam base 54, 70 of cam buckles 18, 22 further include swedge portion 55, 71 respectively. As can be seen in FIG. 5 specifically, swedge portion 55, 71 is formed such that it extends over cross bars 15, 19 respectively. As will be appreciated, swedge portion 55, 71 adds to the structural integrity of cam block 100 (or, in alternate embodiments, of cam block 150) by further securing cam buckles 18, 22 to frame 14. In certain embodiments, the structural integrity of cam block 100 is further increased by the addition of strength bars 51, 54 on cross bar 15 and strength bars 55, 57 on cross bar 19. In certain embodiments strength bars 51, 53, 55, 57 are stamped into cross bars 15, 19. One of ordinary skill in the art will appreciate that while cross bars 15, 19 are illustrated each having two strength bars, this is not meant to be limiting. In other embodiments one or the other or both of cross bars 15, 19 may have less than two or greater than two strength bars.

In preferred embodiments cam buckles 18, 22 are sized proportionally based on the width of the strap they are intended to accept. By way of example and not limitation, in certain embodiments, cam buckles 18, 22 are intended to accept straps that are 4 in. wide and thus are dimensioned such that the receiving end of each is at least 4 in wide. In other embodiments cam buckles 18, 22 are intended to accept straps that are ¾ in. wide. In yet other embodiments cam buckles 18, 22 are intended to accept straps that are between ¾ in. to 4 inches wide. In yet further embodiments cam buckles 18, 22 are intended to accept straps that are greater than 4 in. wide.

Figure 7B:
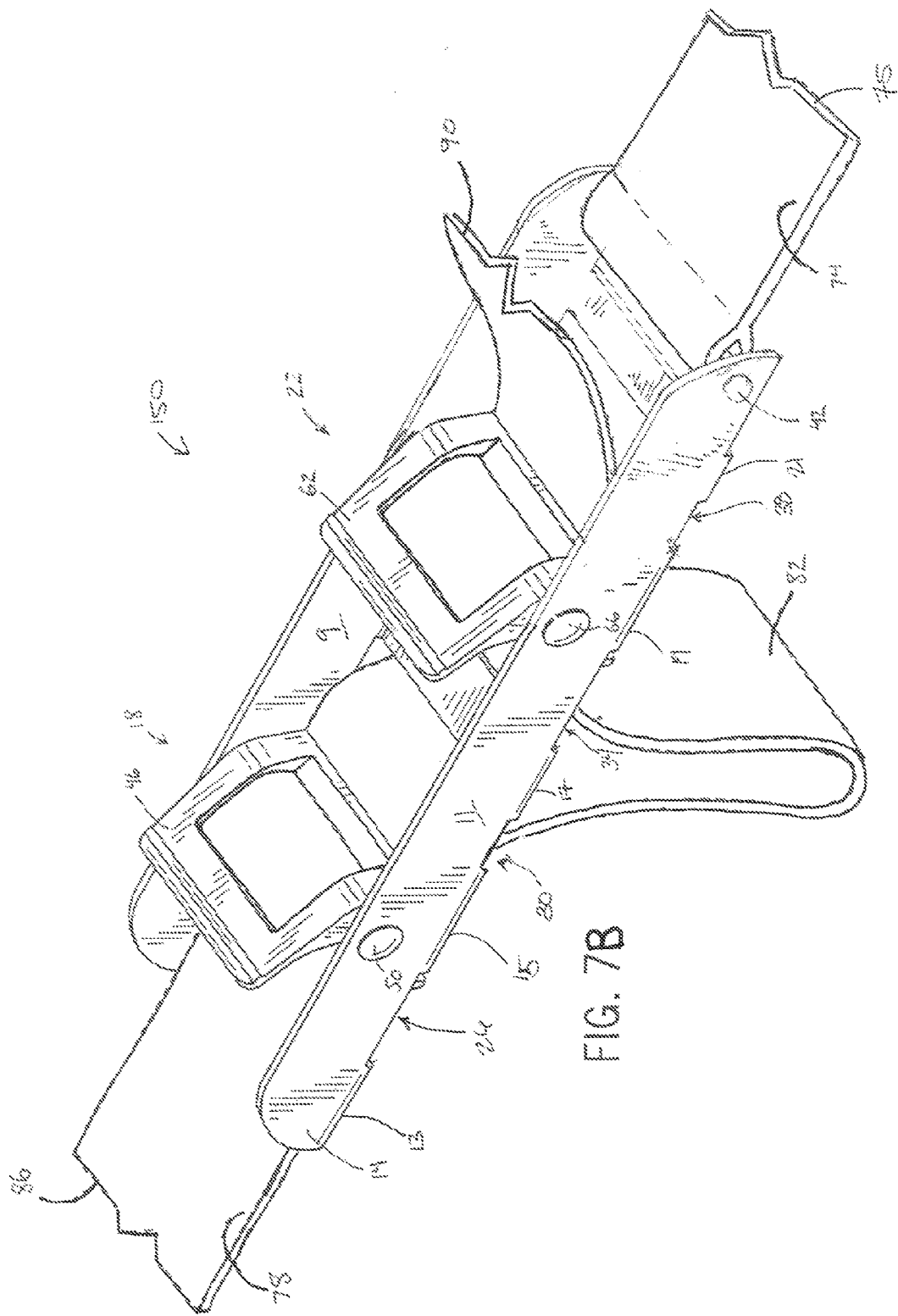
FIG. 7B is a perspective view of a shipping strap assembly including the cam block of FIG. 1B.

Turning to FIGS. 7A and 7B, assembly and operation of cam blocks 100 and 150 will be described. As can be seen in the illustrated embodiments of FIGS. 7A and 7B, strap 78 is fed through the cam buckle 18, aperture 30, aperture 34, and the cam buckle 22 such that a noose section 82 is formed between cam buckle 18 and cam buckle 22. Once installed in the cam block 100 or 150, strap 78 defines a first end 86 that extends from the first cam buckle 18 and a second end 90 that extends from the second cam buckle 22.

As seen in FIG. 7B, when cam block 150 is being used, a further strap, strap 74, is coupled to the pin 42 by a sewn loop. In other embodiments, the first strap 74 may be coupled to the pin 42 in another way, as desired.

In certain embodiments one or more of ends 86, 90, and 75 terminate in a sewn loop. In certain embodiments one or more of ends 86, 90, and 75 are attached to an E-track fitting, A-track fitting, L-track fitting or the like. In certain embodiments one or more of ends 86, 90, and 75 are attached to a hook, S-hook, J-hook, sling hook, grab hook, ring, D-ring, clip, clamp, coupler, shackle, ratchet or the like. One of ordinary skill will appreciate that the foregoing list of termination styles for ends 86, 90, 75 is not meant to be exhaustive and other styles are contemplated and well within the scope of the present invention. FIGS. 8-10 illustrate the use of cam block 150 specifically wherein one or more ends 86, 90, and 75 terminate in a clasp or hook 94, loop 98, or straight end 102.

In certain embodiments straps 74, 78 comprise a nylon webbing. In certain embodiments straps 74, 78 comprise a lifting grade nylon webbing. In certain embodiments straps 74, 78 are graded for working loads of 9800 lbs. In certain embodiments straps 74, 78 are graded for working loads of 13000 lbs. In certain embodiments straps 74, 78 are graded for working loads of 18000 lbs. In certain embodiments straps 74, 78 are graded for working loads of greater than 18000 lbs. In certain embodiments straps 74, 78 comprise a webbing other than nylon. In certain embodiments straps 74, 78 are treated to increase abrasion resistance and degradation.

The noose section 82 can be adjusted in two ways. First, a user may actuate the first cam buckle 18 to the disengaged position, and pull on the first end 86 or on the noose section 82 to lengthen or shorten the noose section 82. Second, the user may actuate the second cam buckle 22 to the disengaged position, and pull on the second end 90 or on the noose section 82 to lengthen or shorten the noose section 82. In this way, the position of the noose section 82 on the second strap 78 and the size of the noose section 82 may be manipulated.

Turning to FIG. 8, two uses of the cam block 150 are shown. The first use includes a first noose assembly 200 strung across a width of a truck trailer 204 between two opposing side racks 208. The first noose assembly 200 is clipped to the side racks 208 with clasps 94 and the noose section 82 is used to tighten the first noose assembly 200 between the side racks 208. The first strap 74 of a second noose assembly 200 is then clipped to the first noose assembly 200, and the noose section 82 of the second noose assembly 200 is looped over a top heavy item 212. The noose section 82 is then tightened around the top heavy item 212 by pulling on the second end 90 of the second strap 78. In this way, the top heavy item 212 can be tethered to the truck trailer 204 by a single worker and can be manipulated. For example, such a configuration allows the top heavy item 212 to be safely and securely unloaded or loaded from a liftgate truck as the item is prevented from toppling while on the moving liftgate, eliminating the risk that a worker will be injured or the item damaged. Further, the worker, by holding onto loop end 98, maintains complete control over the item as they are operating the liftgate.

FIG. 8 also shows a second use of the cam block 150. An item 216 is arranged adjacent a wall of the truck trailer 204. The first strap 74 and the first end 86 of the second strap 78 of a noose assembly 200 are clipped to the side rack 208, and the noose section 82 is manipulated to tighten the item 216 against the wall securely. This provides a secure hold down for the item 216 during transit or storage.

FIG. 9 shows another use of the noose assembly 200. In a warehouse 220 including wall racks 224, a clasp 94 arranged on the first end 86 of the second strap 78 of a noose assembly 200 is clipped to the wall rack 224. In FIG. 9, the first strap 74 is removed, though the illustrated example is still practicable with the first strap 74 installed. An irregularly shaped item 228 is placed through the noose section 82 and the cam buckles 18, 22 are manipulated to tighten the item 228 into the noose section 82 and elevate the item 228 off a floor 232 of the warehouse 220. This provides an easily adaptable storage solution without the use of horizontal deck racks, stages, or shelves that take up height in the warehouse 220 or other storage areas such as shipping docks or holding areas. Furthermore, a single operator can secure item 228 by themselves and without the need of a forklift, thereby lessening the risk that the worker will be injured or the item damaged.

FIG. 10 shows two additional uses of the noose assembly 200. The noose assembly 200 is strung across a width of the truck trailer 204 between two opposing side racks 208. The first noose assembly 200 is clipped to the side racks 208 with clasps 94 and the noose section 82 is used to tighten the first noose assembly 200 between the side racks 208. In this way, the noose assembly 200 can inhibit shifting or toppling of items held therebehind.

FIG. 10 shows another use of the noose assembly 200. To secure an odd shaped item 236 that is necessarily separated from a wall, such as a round drum arranged on a pallet, the first and second straps 74, 78 are anchored to a side rack 208 and the noose assembly 200 is arranged around the item 236. The noose section 82 is then looped around the item 236 as well. The noose section 82 is tightened around the item 236, and the strap 78 is manipulated to secure the item 236 to the wall. This arrangement offers more support than a standard strap as used in the prior art. Furthermore, it allows items such as drums to be shipped without separating the same from the transport pallet.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements within the spirit and scope of the invention as set forth in the appended claims.

I claim:

1. A shipping strap assembly comprising:
   a cam block, comprising:
      a frame;
      a first cam buckle mounted to the frame; and
      a second cam buckle mounted to the frame and oriented in the same direction as the first cam buckle;
   a first strap coupled to the cam block such that the first strap includes a first portion extending from a first end of the cam block and a second portion extending from a second end of the cam block, wherein the first strap is adjustable to form a noose between the first portion and the second portion in cooperation with the cam block, wherein the first strap engages the first cam buckle and the second cam buckle;
   a first attachment element disposed on the first portion; and
   a second attachment element disposed on the second portion.

2. The shipping strap assembly of claim 1, wherein the frame further comprises:
   a first side;
   a second side opposing the first side; and
   a pin extending from the first side to the second side;
   wherein the shipping strap assembly further comprises a second strap disposed on the pin, the second strap having a third attachment element disposed thereon.

3. The shipping strap assembly of claim 2, wherein the first attachment element, the second attachment element, and the third attachment element are selected from the group consisting of:
   an E-track fitting;
   an A-track fitting;
   an L-track fitting
   a hook;
   a ring;
   a clip;
   a clamp;
   a coupler;
   a shackle; and
   a loop.

4. The shipping strap assembly of claim 3, wherein the first attachment element differs from at least one of the second attachment element and the third attachment element.

5. The shipping strap assembly of claim 2, wherein the first side and the second side of the frame are connected by a first cross bar and a second cross bar, wherein the first cross bar has a plurality of strength bars disposed thereon.

6. The shipping strap assembly of claim 5, wherein the first cam buckle is disposed on the first cross bar and the second cam buckle is disposed on the second cross bar.

7. The shipping strap assembly of claim 6, wherein the first cam buckle includes a base, wherein the base is attached to the first cross bar via swedge portion.

8. The shipping strap assembly of claim 1, wherein the first cam buckle and the second cam buckle are each rotatable and have an engaged position and a disengaged position.

9. The shipping strap assembly of claim 8, wherein the first cam buckle and the second cam buckle are each biased towards the engaged position.

* * * * *